United States Patent
Hofbauer et al.

(10) Patent No.: US 8,956,052 B2
(45) Date of Patent: Feb. 17, 2015

(54) SEALED ANTI-FRICTION BEARING

(75) Inventors: Felix Hofbauer, Schweinfurt (DE); Rainer Schroder, Egenhausen (DE); Martin Grehn, Dittelbrunn (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/882,533

(22) PCT Filed: Oct. 28, 2011

(86) PCT No.: PCT/EP2011/068993
§ 371 (c)(1),
(2), (4) Date: Apr. 30, 2013

(87) PCT Pub. No.: WO2012/062608
PCT Pub. Date: May 18, 2012

(65) Prior Publication Data
US 2013/0216171 A1      Aug. 22, 2013

(30) Foreign Application Priority Data

Nov. 12, 2010   (DE) .......................... 10 2010 051 230

(51) Int. Cl.
*F16J 15/32* (2006.01)
*F16C 33/76* (2006.01)
*F16C 33/78* (2006.01)
*F16C 23/08* (2006.01)
*F16C 19/22* (2006.01)

(52) U.S. Cl.
CPC ........... *F16C 33/7886* (2013.01); *F16C 23/086* (2013.01); *F16C 33/7806* (2013.01); *F16C 19/22* (2013.01)
USPC .......................................... 384/484; 277/551

(58) Field of Classification Search
CPC ............. F16C 33/7853; F16C 33/7806; F16C 33/7886; F16C 23/086; F16C 19/22
USPC .................... 384/477–489; 277/551, 353, 560
See application file for complete search history.

(56) References Cited

U.S. PATENT DOCUMENTS

| | | | |
|---|---|---|---|
| 3,519,316 A * | 7/1970 | Gothberg | 384/486 |
| 3,556,539 A | 1/1971 | Senigalliesi | |
| 3,573,871 A * | 4/1971 | Warner | 277/607 |
| 4,850,722 A | 7/1989 | Bayer | |
| 4,872,770 A | 10/1989 | Dickinson | |
| 5,697,711 A | 12/1997 | Aoki et al. | |
| 6,053,502 A * | 4/2000 | Hallenstvedt | 277/572 |
| 6,402,158 B1 | 6/2002 | Imazaike | |
| 7,066,471 B2 * | 6/2006 | Mause et al. | 277/560 |
| 7,374,345 B2 * | 5/2008 | Ilie et al. | 384/537 |
| 7,785,014 B2 * | 8/2010 | Falk | 384/477 |
| 2003/0198416 A1 * | 10/2003 | Borowski et al. | 384/477 |
| 2012/0177316 A1 * | 7/2012 | Liang et al. | 384/484 |

FOREIGN PATENT DOCUMENTS

| | | |
|---|---|---|
| JP | 2007010114 | 1/2007 |
| WO | 2010099776 | 9/2010 |

* cited by examiner

*Primary Examiner* — Alan B Waits
(74) *Attorney, Agent, or Firm* — Volpe and Koenig, P.C.

(57) ABSTRACT

A sealed anti-friction bearing (1), including an annular sealing washer (11, 12) which seals a rolling-body chamber (7) in the axial direction, wherein the sealing washer (11, 12) has a fastening section (14) for connecting it fixedly to a bearing ring (2) of the anti-friction bearing (1) so as to rotate with it, and wherein the sealing washer (11, 12) is anchored with its fastening section (14) in a circumferential groove (22) of the bearing ring. According to the invention, it is provided that the fastening section (14) has a first clamping element in the form of a barb (19) and a second clamping element in the form of an annular bead (20), and that the barb (19) and the bead (20) enter into a non-positive connection with oppositely lying surfaces of the groove (22).

11 Claims, 5 Drawing Sheets

SEALED ANTI-FRICTION BEARING

FIELD OF THE INVENTION

The invention relates to a sealed anti-friction bearing comprising an annular sealing washer that seals a rolling body chamber in the axial direction, wherein the sealing washer has a fastening section for the rotationally locked connection to a bearing ring of the anti-friction bearing, and wherein the sealing washer is anchored with its fastening section in a circumferential groove of the bearing ring. Such sealed anti-friction bearings, e.g., sealed self-aligning roller bearings, are suitable especially for bearing points where seals that are separate from the anti-friction bearing cannot be provided due to reasons of space and/or costs.

BACKGROUND

On one hand, a sealed anti-friction bearing should make it possible to protect the rolling body chamber, that is, the area of the anti-friction bearing arranged radially between races in a radial bearing, from the environment. This protection should prevent the penetration of dirt, liquids, or other foreign matter into the rolling body space. On the other hand, a sealed anti-friction bearing should also prevent the discharge of lubricant, typically lubricating grease or lubricating oil, to the outside or should reduce this at least to an acceptable level. Overall, a sealed anti-friction bearing thus has a longer service life than a comparable non-sealed anti-friction bearing.

From JP2007010114A, a sealed anti-friction bearing according to the class is known, with a circumferential groove being located on both a first end side and a second end side on the outer ring of such a bearing. A sealing washer is anchored in each groove by means of a fastening section. According to JP2007010114A, in a sectional view including the bearing axis, the fastening section has a rectangular shape that corresponds to the shape of the groove. A disadvantage in the solution according to JP2007010114A is the only inadequate sealing in the area of the fastening section and also the fact that the sealing washer can be installed and/or removed only with difficulty.

From U.S. Pat. No. 4,872,770, a sealed self-aligning roller bearing is known, with a sealing washer being arranged on each axial end of the self-aligning roller bearing. Each of these sealing washers is anchored by means of a fastening section in a groove formed on the outer ring of the bearing. A disadvantage in U.S. Pat. No. 4,872,770 is that only an inadequate sealing is provided between the fastening section of each sealing washer and the outer ring of the bearing.

SUMMARY

The present invention is based on the objective of creating a sealed anti-friction bearing of the type noted above that guarantees an optimum sealing also in the area of the fastening section and makes possible a simple installation and removal of the sealing washer and has a high axial retaining force of the sealing washer and a high retaining force of the sealing washer in the circumferential direction and also makes possible good radial centering of the sealing washer and is simple and economical to manufacture.

This objective is met by a sealed anti-friction bearing according to the independent claim. Accordingly, an anti-friction bearing according to the class is characterized in that the fastening section has a first clamping element in the form of a barb and a second clamping element in the form of an annular bead and the barb and the bead enter into a non-positive connection with opposing surfaces of the groove.

The invention involves the arrangement of providing the fastening section that anchors the sealing washer on the bearing ring with a double clamping and sealing function. Thus, a non-positive connection of the sealing washer and bearing ring shall be realized by a first and a second clamping element and these two clamping elements are simultaneously used to form a seal between the sealing washer and bearing ring.

Because the two clamping elements act on opposing surfaces of the groove, i.e., press against these surfaces, an optimum anchoring of the sealing washer can be created. Due to a high possible clamping force between the sealing washer and bearing ring, a high axial retaining force is produced. In addition, rotation of the sealing washer together with the bearing ring is significantly better protected in comparison to known sealing arrangements.

Because the fastening area is pressed against two opposing surfaces of the groove, a significantly better radial centering of the sealing washer is also set in comparison with the prior art. Finally, this also leads to an improved sealing effect.

According to the invention, the first clamping element involves a barb. That is, the first clamping element is an elastically deformable element that has a high axial retaining force after it is inserted into the groove. The second clamping element is formed by a circumferential bead.

Both the barb and also the bead advantageously comprise elastomer or are made advantageously completely from elastomer. When the sealing washer is anchored on the bearing ring, the barb and bead therefore can deform elastically and produce not only the non-positive connection but also provide the double sealing effect in the area of the fastening section.

The sealed anti-friction bearing according to the invention is suitable especially as a radial bearing. For example, it can be a self-aligning roller bearing, a cylindrical roller bearing, a conical roller bearing, or a spherical roller bearing. In principle, it could be a single-row or multi-row anti-friction bearing.

Embodiments of the invention are specified in the subordinate claims.

According to one embodiment it is provided that the barb contacts a first surface of the groove and the bead contacts a second surface of the groove and in the non-installed state of the sealing washer, the barb extends radially across the first surface of the groove and in the non-installed state of the sealing washer, the bead extends radially across the second surface of the groove. The non-positive connection between the fastening section and the bearing ring is thus achieved by an over-dimension of the fastening section, more precisely, the barb and the bead, relative to the groove.

Especially when the anti-friction bearing according to the invention is a radial bearing, it can be provided according to another embodiment that the groove is formed in an end side of the bearing ring and the barb contacts a first lateral surface of the groove, especially a lateral surface oriented outward in the radial direction and the bead contacts a second lateral surface of the groove, especially a lateral surface oriented inward in the radial direction.

The shape and position of the barb and also of the surface of the groove contacted by the barb can precisely set the non-positive connection between the fastening section and the bearing ring. Thus, according to one embodiment, the barb can be oriented outward in the axial direction with respect to the center point of the anti-friction bearing. This therefore produces a very large axial retaining force of the sealing washer, while making it possible to easily mount it on the bearing ring, that is, insert it into the groove. It can also be provided that the first lateral surface has a circumferential retaining groove oriented essentially outward in the radial direction for snapping in the barb. The retaining force is here further reinforced and the barb snapped into the retaining groove provides a very good sealing effect.

The contact between the barb and groove can be realized by means of a truncated cone-shaped end surface of the barb and a similarly truncated cone-shaped support surface in the groove. If the barb engages in a retaining groove, the support surface can be a side surface of the retaining groove. According to one embodiment it is provided that an end surface of the barb encloses an angle α with a plane that is perpendicular to the bearing axis and a support surface of the bearing ring for the barb encloses an angle β with the plane, wherein α is less than or equal to β. The selection of the angles α and β can produce a precise snapping in of the retaining tab in the groove, e.g., by means of the retaining groove. The difference of the angles α and β can be in the range from 0.5 degrees to 20 degrees. If the angles α and β are equal, a planar contact is produced between the end surface of the barb and the support surface of the bearing ring.

To simplify the installation, a gap can be provided between an axial end surface of the fastening section and a groove base of the groove. This gap makes possible excess pressing of the sealing washer during installation, so that it is guaranteed that the barb is optimally placed in the groove. Especially if the groove has the circumferential retaining groove, it has been shown that with this gap, it is guaranteed every time that the barb can snap completely into the retaining groove, namely, an installer pushes the sealing washer in (excess pressure) up to an axial stop of the fastening section on the groove base.

According to another embodiment it is provided that the sealing washer has a stabilization section that has at least one circumferential flange and the flange is positioned such that the rolling bodies of the anti-friction bearing run against the sealing washer only in the area of the flange. In principle, one or more flanges already reinforce the sealing washer because its stiffness is increased and thus the sealing washer better holds its shape and position. This is advantageous especially for anti-friction bearings with large diameters. However, the at least one flange should also be used as a stop for the rolling bodies. Thus, the flange can be positioned and formed such that, for example, for a self-aligning roller bearing whose normal defined pivot angle is exceeded, the barrel rollers contact the flange with their end sides. Flanges formed in this way contribute significantly to increasing the service life of the sealed anti-friction bearing, because, in comparison to conventional sealing washers with or without flanges in which parts of the anti-friction bearing cage contact the sealing washer, a significantly more controlled and thus lower friction contact is realized. In particular, it can be provided that the at least one flange projects into the rolling body chamber in the axial direction.

According to another embodiment it is provided that the sealing washer comprises a sealing lip section for the sealed contacting of a second bearing ring, wherein the sealing lip section has a leg that is inclined outward in the axial direction with at least two sealing lips. Through the leg inclined outward in the axial direction, one end area of the leg points axially away from the rolling body chamber. This makes possible a controlled discharge of the lubricant located in the rolling body chamber as soon as this exceeds a certain pressure (e.g., for lubricating the anti-friction bearing). In principle, the sealing lip section should provide only a sealing contact to the second bearing ring and should make possible, in particular, a relative rotation between the two elements with as little friction as possible. This is achieved by the use of separate, for example, two sealing lips.

According to another embodiment it is provided that the sealing washer has reinforcement, wherein the reinforcement is completely surrounded with elastomer in the area of the fastening section, wherein the reinforcement in the area of a stabilization section is surrounded with elastomer only on an axially outer side and wherein the reinforcement is completely surrounded with elastomer in the area of a sealing section. The reinforcement, e.g., by means of a metal reinforcement washer, generally leads to improved stiffness of the sealing washer. Through the targeted application of a plastic, e.g., rubber on certain areas of the reinforcement, both the desired anchoring of the sealing washer (through elastic deformation of the plastic barb and also the plastic bead in the fastening section) and also the necessary sealing effect can be achieved (in the fastening section and in the sealing section). The open reinforcement on the side of the stabilization section turned axially in the direction of a bearing center makes it possible for the rolling bodies, e.g., roller end surfaces, to run against the reinforcement of the sealing washer, which prevents rubbed-off plastic parts due to this contact. If the sealing lip section has a leg (inclined outward in the axial direction), this cannot have reinforcement. This measure makes a discharge of lubricant from the rolling body chamber easier, e.g., during lubrication.

According to another embodiment it is provided that the sealed anti-friction bearing comprises a second annular sealing washer and a sealing washer is anchored on each axial end of the bearing ring. The anti-friction bearing is thus constructed as a completely sealed unit. Obviously it would also be conceivable to arrange two anti-friction bearings according to the invention with only one sealing washer directly next to the other in the axial direction, wherein each sealing washer would be arranged on the outside in the axial direction.

BRIEF DESCRIPTION OF THE DRAWINGS

Embodiments of the invention are described in more detail below with reference to the accompanying figures. Shown are FIG. 1 a perspective sectional view of a sealed anti-friction bearing according to the invention, FIG. 2 a detailed view of a sectional view of the anti-friction bearing from FIG. 1 comprising the bearing axis.

DETAILED DESCRIPTION OF THE PREFERRED EMBODIMENTS

Identical or functionally identical components are marked with identical reference symbols below.

Figure 1:
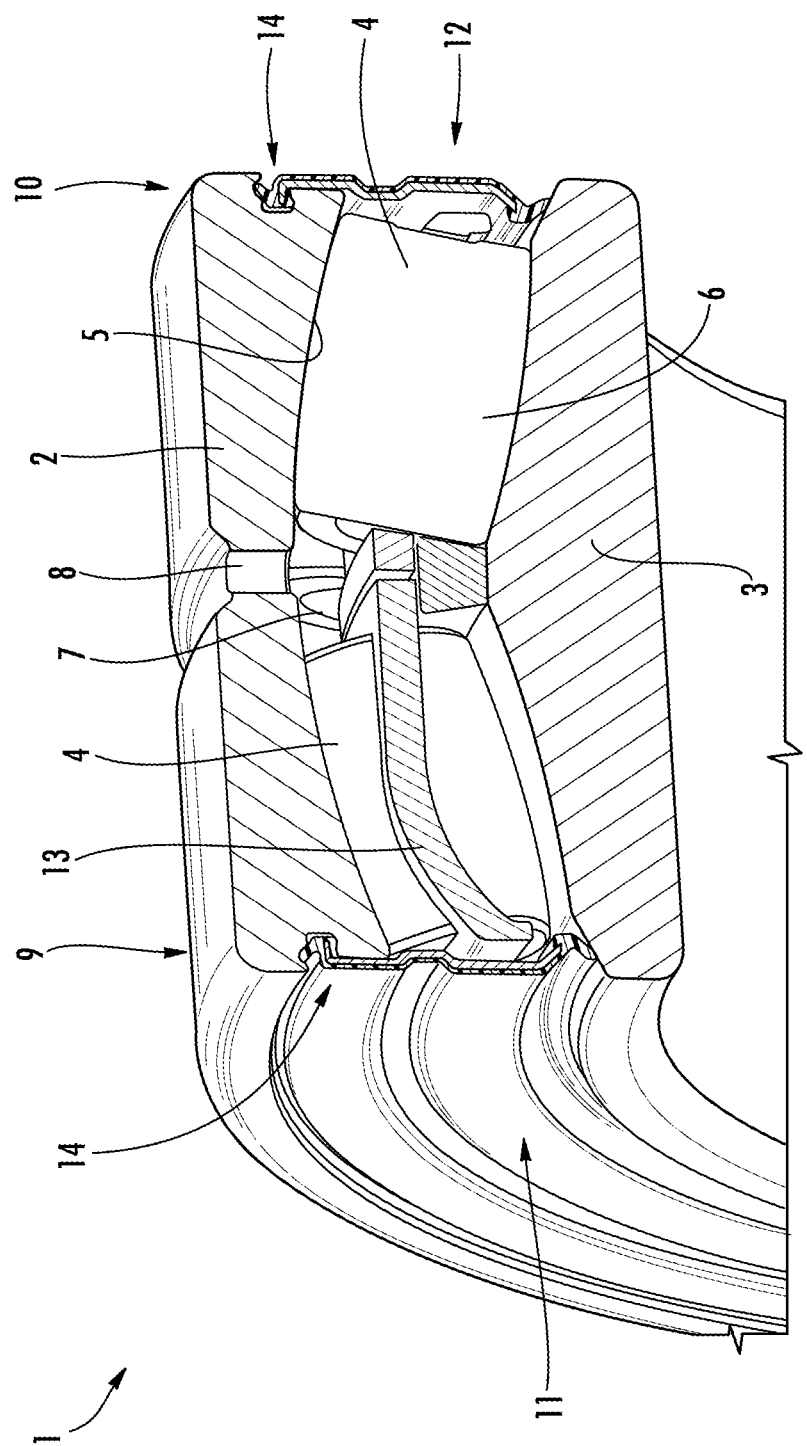

FIG. 1 shows a perspective sectional view of a sealed anti-friction bearing 1 according to the invention. The anti-friction bearing 1 is a self-aligning roller bearing comprising a first bearing ring 2, namely an outer ring, a second bearing ring 3, namely an inner ring, and also a plurality of roller bodies 4 that roll on tracks 5, 6 of the first and second bearing rings 2, 3. The roller bodies 4 are guided by a cage 13.

The rolling body chamber 7 formed between the tracks 5, 6 is filled partially with not-shown lubricant. The lubricant can be filled later via a drilled lubrication hole 8 and is prevented from leaking into the environment by two sealing washers 11, 12 arranged on the axial ends 9, 10.

Each of the sealing washers 11, 12 is anchored by means of a fastening section 14 with the first bearing ring 2. That is, the sealing washers 11, 12 are locked in rotation with the bearing ring 2.

The sealing washers 11, 12 at the two axial ends 9, 10 are identical.

Figure 2:
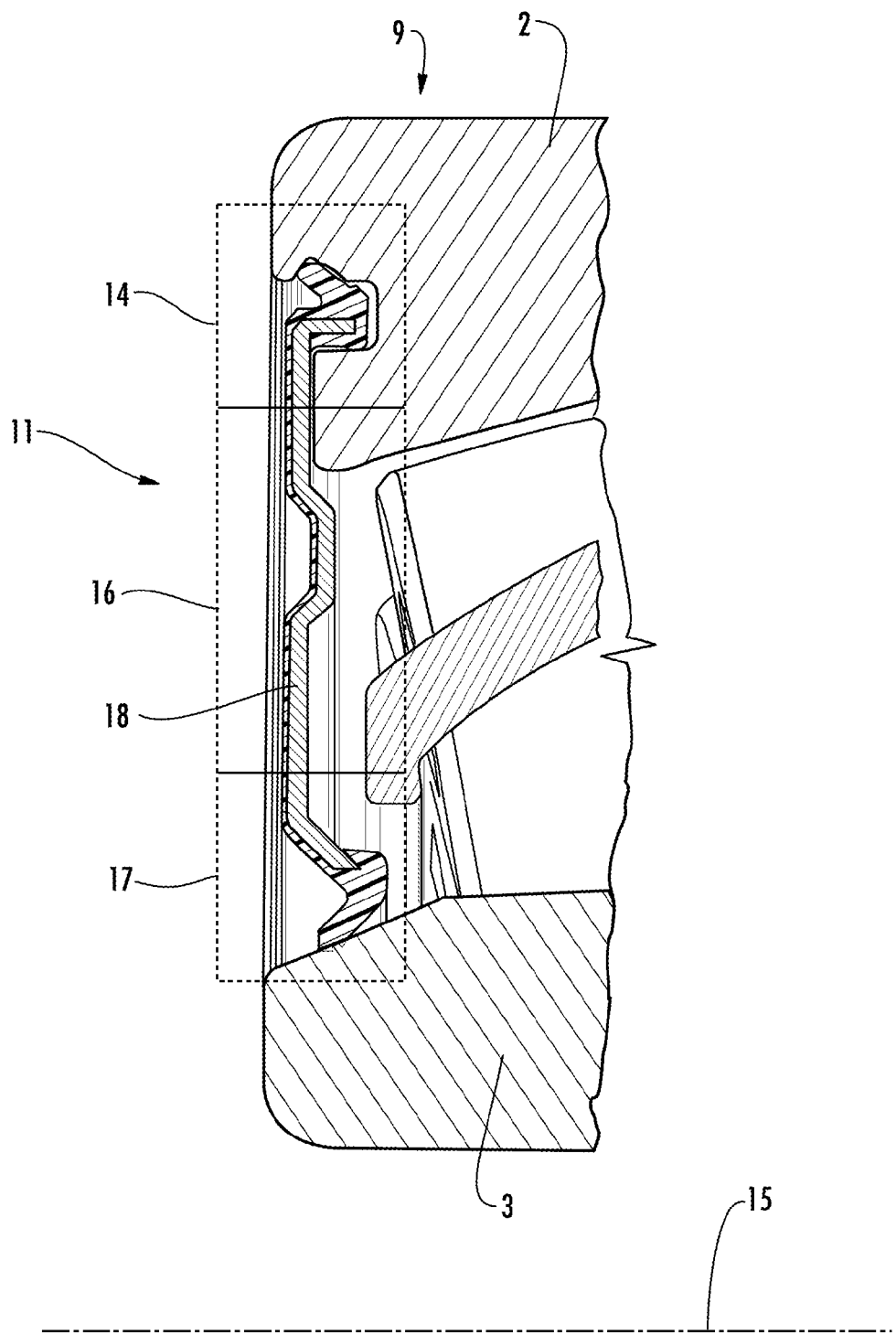

FIG. 2 shows a detailed view of a sectional view of the anti-friction bearing 1 from FIG. 1 comprising the bearing axis 15. Shown is an axial end 9 of the anti-friction bearing 1.

The sealing washer 11 located at this axial end 9 comprises three sections: a fastening section 14 with which the sealing washer 11 is anchored on the first bearing ring 2, a stabilization section 16 that increases the stiffness of the sealing washer 11, and a sealing lip section 17 that provides a sealing contact between the sealing washer 11 and second bearing ring 3. The fastening section 14 is thus located on a different bearing ring than the sealing lip section 17 and both sections are separated from each other by the stabilization section 16. The sections are outlined in FIG. 2 by dashed lines for illustration.

The sealing washer 11 has reinforcement 18 in the form of a single annular metal plate. The reinforcement 18 extends from the fastening section 14 across the stabilization section 16 up to the sealing lip section 17.

Figure 3A:
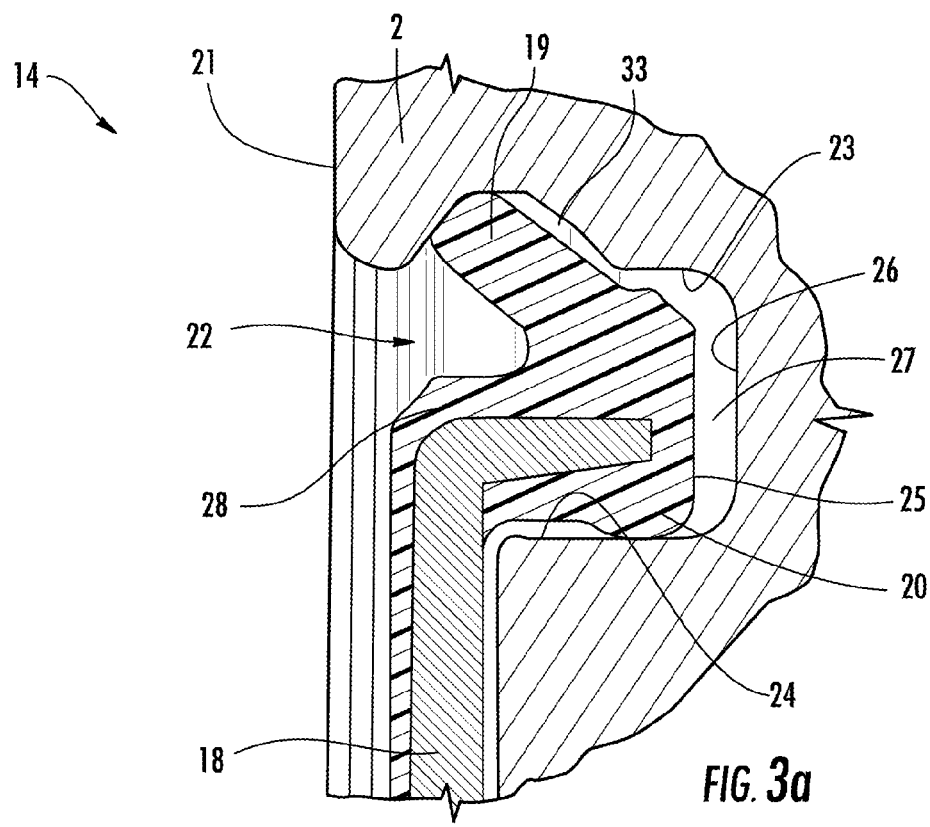
FIGS. 3A-3C are enlarged cross-sectional views from FIG. 2, and FIG. 4 a detailed view of a fastening section according to a second embodiment.

FIG. 3a shows an enlarged section from FIG. 2, namely the fastening section 14 that has a first clamping element in the form of a barb 19 and a second clamping element in the form of a bead 20.

The fastening section 14 engages in a groove 22 arranged on one end side 21 of the first bearing ring 2. The barb 19 is here snapped into a retaining groove 33 oriented outward in the radial direction in a first lateral surface 23 of the groove 22. The bead 20 contacts a second lateral surface 24 of the groove 22.

For the purpose of illustration, in FIG. 3a the original shapes of the barb 19 and the bead 20 are shown, that is, before the sealing washer 11 has been inserted into the groove 22. As can be seen, both the barb 19 and also the bead 20 have an over-dimension relative to the installation space provided in the installation position. This over-dimension provides, on one hand, a stable and self-centering anchoring of the sealing washer 11 in the first bearing ring 2. On the other hand, targeted sealing points are produced on the barb 19 and bead 20. It has been shown that sealing points controlled in this way create a significantly more secure sealing in comparison to fastening section seals that expand across its entire extent. The sealed section is indeed smaller overall, but the seal can be significantly better controlled by means of two controlled and defined areas, especially also with respect to unavoidable manufacturing tolerances.

Between one axial end surface 25 of the fastening section 14 and one groove base 26 there is a gap 27 that guarantees, when the sealing washer 11 is installed, that the barb 19 can snap completely into the retaining groove 33, in that the sealing washer 11 can be pushed farther in the direction of the gap 27 than the installation position requires.

As can be also seen in FIG. 3a, the reinforcement 18 is completely surrounded by plastic 28 essentially in the area of the fastening section. The barb 19 and the bead 20 are formed from plastic.

Figure 3C:
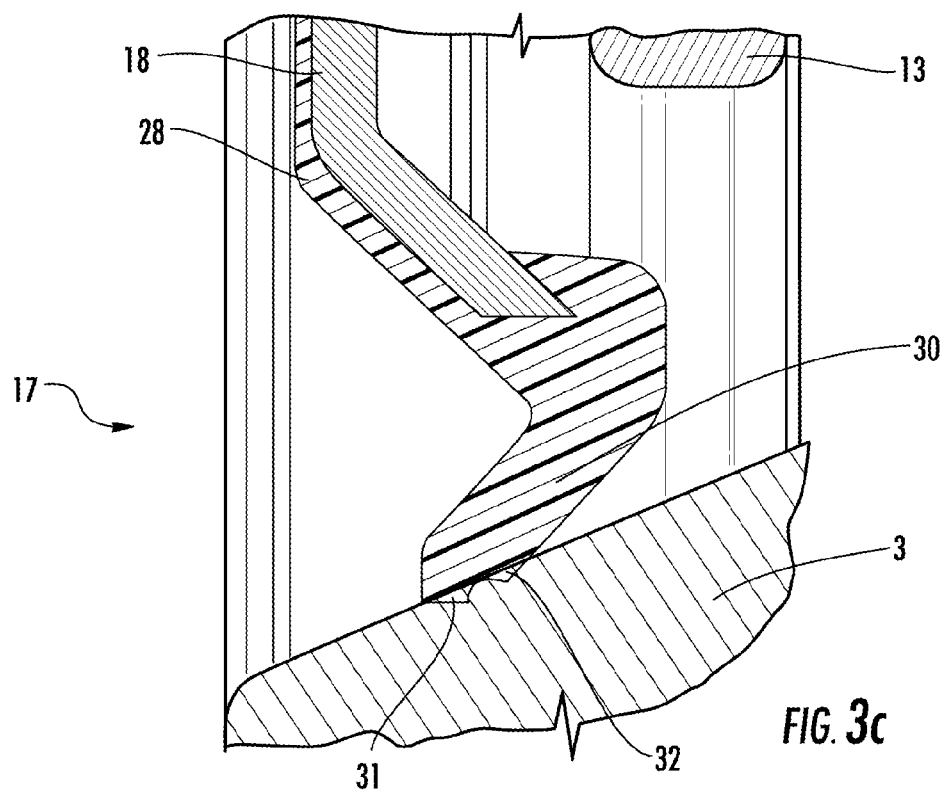
Figure 3B:
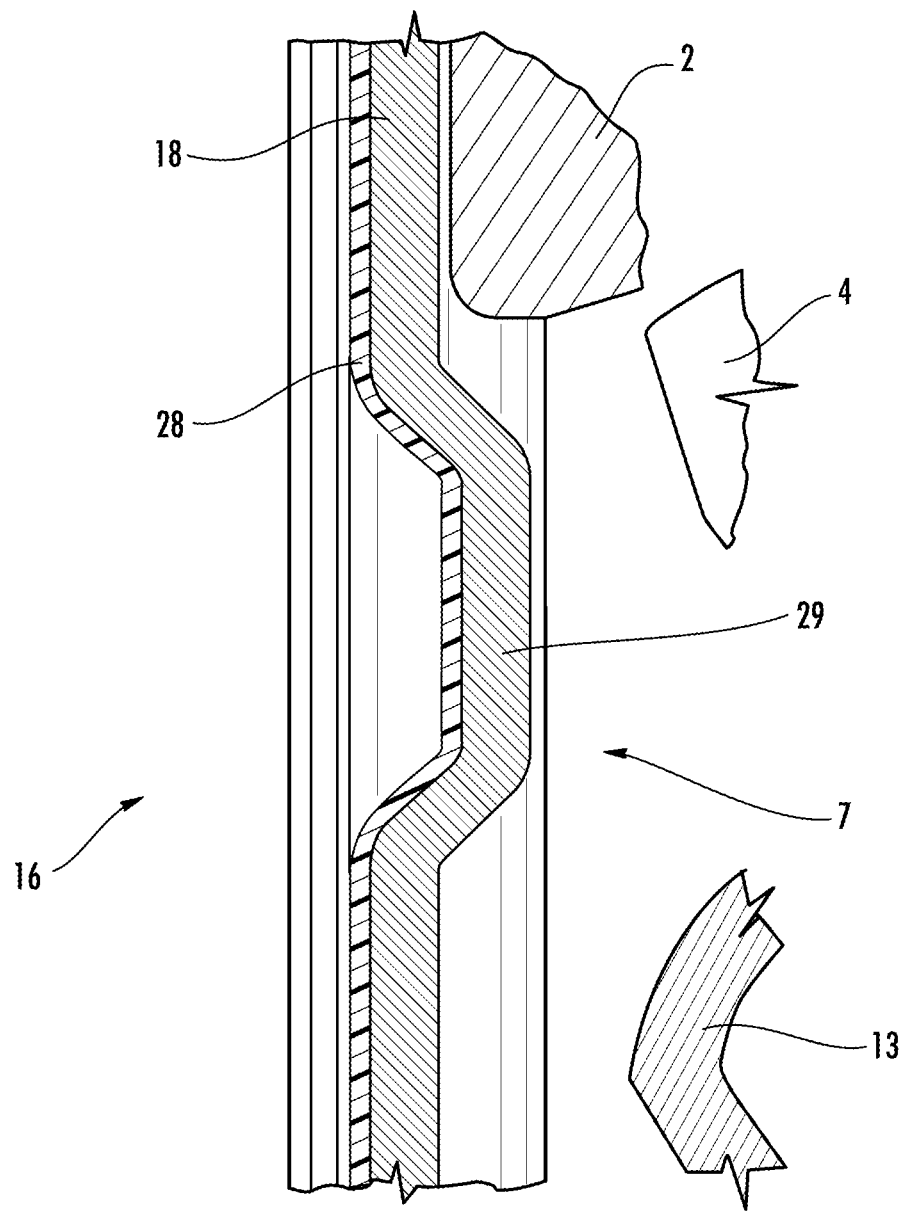

In FIG. 3b, the stabilization section 16 is shown in detail, wherein a flange 29 oriented in the rolling body chamber 7 in the axial direction is shown. On the side of the sealing washer 11 oriented in the axial direction at a bearing center, the reinforcement 18 has no plastic coating. Only the side of the stabilization section 16 turned outward in the axial direction has a coating made from plastic 28 on the reinforcement 18.

The flange 29 is positioned and shaped so that the cage 13 never comes into contact with the sealing washer 11 during the (extreme) pivoting of the self-aligning roller bearing: as the first and only element of the rolling body set, the rolling bodies—not shown in FIG. 3b—contact the flange 29 of the sealing washer 11 by means of their end sides.

FIG. 3c shows an enlarged view of the sealing lip section 17 comprising a leg 30 oriented outward in the axial direction. The leg 30 made completely from plastic has two sealing lips 31, 32 spaced apart in the axial direction.

For illustration, FIG. 3c shows the sealing lips 31, 32 in a non-deformed state, i.e., for a non-installed sealing washer 11. The over-dimension of the non-deformed sealing lips 31, 32 relative to the installation position produces a reliable, double sealing function.

Figure 4:
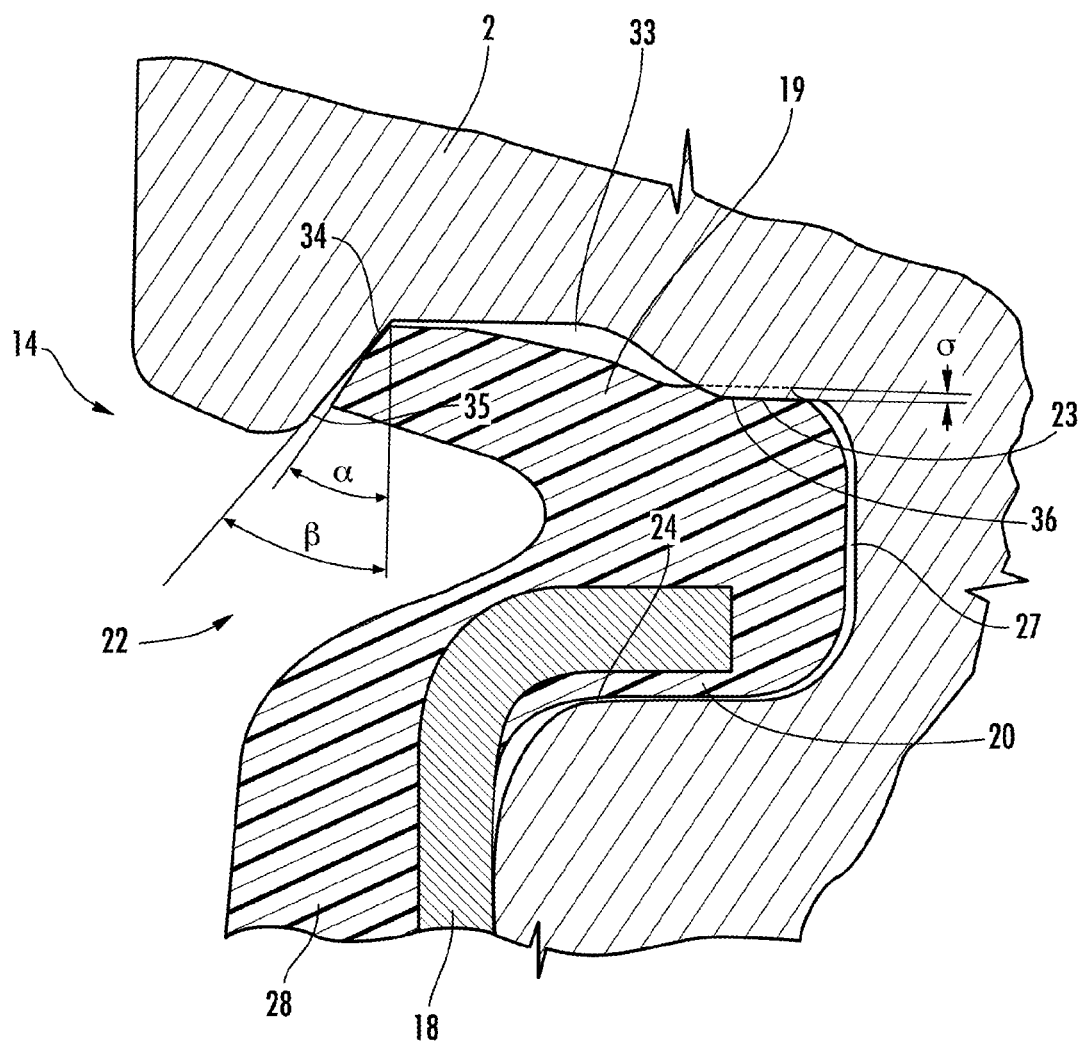

In a detailed view, FIG. 4 shows a fastening section according to a second embodiment. One essential different to the first embodiment is that the angles α and β are now no longer equal, but instead the angle α is less than the angle β.

Furthermore, the fastening section 14 has a third clamping element in the form of another circumferential bead 36. This bead 36 is elastically deformed when the sealing washer is pressed into the groove 22 and is in contact with the first lateral surface 23 of the groove 22. The bead 36 is arranged on a surface of the sealing washer that opposes the surface containing the bead 20 in the radial direction, namely the second lateral surface 24. Therefore the retaining force of the sealing washer is further increased in the circumferential direction. The two beads 20, 36 are arranged essentially concentrically. In FIG. 4, the measure of the elastic deformation of the bead 36 is shown by the projection a relative to the non-deformed shape.

| | List of reference numbers |
|---|---|
| 1 | Sealed anti-friction bearing |
| 2 | First bearing ring |
| 3 | Second bearing ring |
| 4 | Roller body |
| 5, 6 | Track |
| 7 | Rolling body chamber |
| 8 | Drilled lubrication hole |
| 9, 10 | Axial end of the anti-friction bearing |
| 11, 12 | Sealing washer |
| 13 | Cage |
| 14 | Fastening section |
| 15 | Bearing axis |
| 16 | Stabilization section |
| 17 | Sealing lip section |
| 18 | Reinforcement |
| 19 | Barb |
| 20 | Bead |
| 21 | End side |
| 22 | Groove |
| 23 | First lateral surface |
| 24 | Second lateral surface |
| 25 | Axial end surface |
| 26 | Groove base |
| 27 | Gap |
| 28 | Plastic |
| 29 | Flange |
| 30 | Leg |
| 31, 32 | Sealing lip |
| 33 | Retaining groove |
| 34 | End surface |
| 35 | Support surface |
| 36 | Bead |

The invention claimed is:

1. Sealed anti-friction bearing, comprising a bearing ring, rolling bodies, an annular sealing washer that seals a rolling body chamber in an axial direction, the sealing washer has a fastening section for rotationally locked connection to the bearing ring, and the sealing washer is anchored with the fastening section in a circumferential groove of the bearing ring, the fastening section has a first clamping element comprising a barb and a second clamping element comprising an annular bead, the barb and the bead are arranged on opposite radial faces of the fastening section, and the barb and the bead enter into a snap-in connection with opposing surfaces of the groove, wherein the sealing washer has a stabilization section that has at least one circumferential flange and the flange is positioned such that the rolling bodies of the anti-friction bearing run against the sealing washer only in an area of the flange.

2. Sealed anti-friction bearing according to claim 1, wherein the barb is oriented outward in the axial direction with respect to a center point of the anti-friction bearing.

3. Sealed anti-friction bearing according to claim 1, wherein the barb contacts a first surface of the groove and the bead contacts a second surface of the groove and in a non-installed state of the sealing washer, the barb extends in a radially outer direction past the first surface of the groove, and in the non-installed state of the sealing washer, the bead extends in a radially inner direction past the second surface of the groove.

4. Sealed anti-friction bearing according to claim 1, wherein the groove is formed in an end side of the bearing ring and the barb contacts a first lateral surface of the groove, and the bead contacts a second lateral surface of the groove.

5. Sealed anti-friction bearing according to claim 4, wherein the first lateral surface has a circumferential retaining groove oriented in a radially outward direction for snapping in the barb.

6. Sealed anti-friction bearing according to claim 1, wherein an end surface of the barb extends at an angle $\alpha$ with a plane that is perpendicular to the bearing axis and a support surface of the bearing ring for the barb extends at an angle $\beta$ with the plane, wherein $\alpha$ is less than or equal to $\beta$.

7. Sealed anti-friction bearing according to claim 1, wherein a gap is located between an axial end surface of the fastening section and a groove base of the groove.

8. Sealed anti-friction bearing according to claim 1, wherein the at least one flange projects into the rolling body chamber in the axial direction.

9. Sealed anti-friction bearing according to claim 1, wherein the sealing washer comprises a sealing lip section for sealed contacting of a second bearing ring, wherein the sealing lip section has a leg that is inclined outward in the axial direction with at least two sealing lips.

10. Sealed anti-friction bearing according to claim 9, wherein the sealing washer has a reinforcement, the reinforcement is completely surrounded with elastomer in an area of the fastening section, the reinforcement contacts the elastomer only on one axially outer side in an area of a stabilization section, and the reinforcement is completely surrounded with the elastomer in an area of a sealing section.

11. Sealed anti-friction bearing according to claim 10, wherein the leg of the sealing lip section has no reinforcement.

* * * * *